(12) United States Patent
Merkin et al.

(10) Patent No.: US 8,347,378 B2
(45) Date of Patent: Jan. 1, 2013

(54) AUTHENTICATION FOR COMPUTER SYSTEM MANAGEMENT

(75) Inventors: Aaron E. Merkin, Holly Springs, NC (US); Mark A. Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 11/609,437

(22) Filed: Dec. 12, 2006

(65) Prior Publication Data
US 2008/0141350 A1 Jun. 12, 2008

(51) Int. Cl.
G06F 11/00 (2006.01)
H04L 29/06 (2006.01)

(52) U.S. Cl. ............... 726/18; 726/6; 726/19; 713/168; 713/182

(58) Field of Classification Search .................. 713/168; 726/5, 8, 21, 2, 18; 709/225, 229
See application file for complete search history.

(56) References Cited

U.S. PATENT DOCUMENTS

| | | | |
|---|---|---|---|
| 5,742,677 A | 4/1998 | Pinder et al. | |
| 6,298,072 B1 | 10/2001 | Koliczew | |
| 6,389,539 B1 | 5/2002 | Hamilton, II et al. | |
| 6,674,767 B1 * | 1/2004 | Kadyk et al. | 370/466 |
| 6,678,826 B1 * | 1/2004 | Kelly et al. | 726/2 |
| 2002/0095605 A1 | 7/2002 | Royer et al. | |
| 2002/0116485 A1 * | 8/2002 | Black et al. | 709/223 |
| 2003/0021250 A1 * | 1/2003 | Willins et al. | 370/338 |
| 2003/0233583 A1 * | 12/2003 | Carley | 713/201 |
| 2003/0237004 A1 * | 12/2003 | Okamura | 713/201 |
| 2004/0193906 A1 | 9/2004 | Dar et al. | |
| 2004/0268140 A1 * | 12/2004 | Zimmer et al. | 713/200 |
| 2005/0015601 A1 | 1/2005 | Tabi | |
| 2005/0129035 A1 | 6/2005 | Saito | |
| 2007/0073633 A1 * | 3/2007 | Gallant et al. | 707/1 |

FOREIGN PATENT DOCUMENTS

JP 2004242161 8/2004

OTHER PUBLICATIONS

"Sharing a secret: How Kerberos Works"; Applied Cryptography: Protocols, Algorithms, and Source Code in C; 2nd edition: Bruce Schneier; Wiley, 1995. (computerworld.com/computerworld/records/images/pdf/kerberos_chart.pdf).*

* cited by examiner

*Primary Examiner* — Taghi Arani
*Assistant Examiner* — Mohammad L Rahman
(74) *Attorney, Agent, or Firm* — Cynthia S. Seal; Hoffman Warnick LLC

(57) ABSTRACT

An improved solution for authenticating a user seeking to manage a computer system is provided according to aspects of the invention. A user seeking to perform out-of-band management of the computer system can provide a set of credentials to a service processor, which in turn provides them to the computer system for authentication. Additionally, a user seeking to perform in-band management of the computer system can provide a set of credentials to a management agent executing on the computer system for authentication. In either case, the computer system can authenticate the set of credentials, e.g., using an operating system interface.

20 Claims, 2 Drawing Sheets

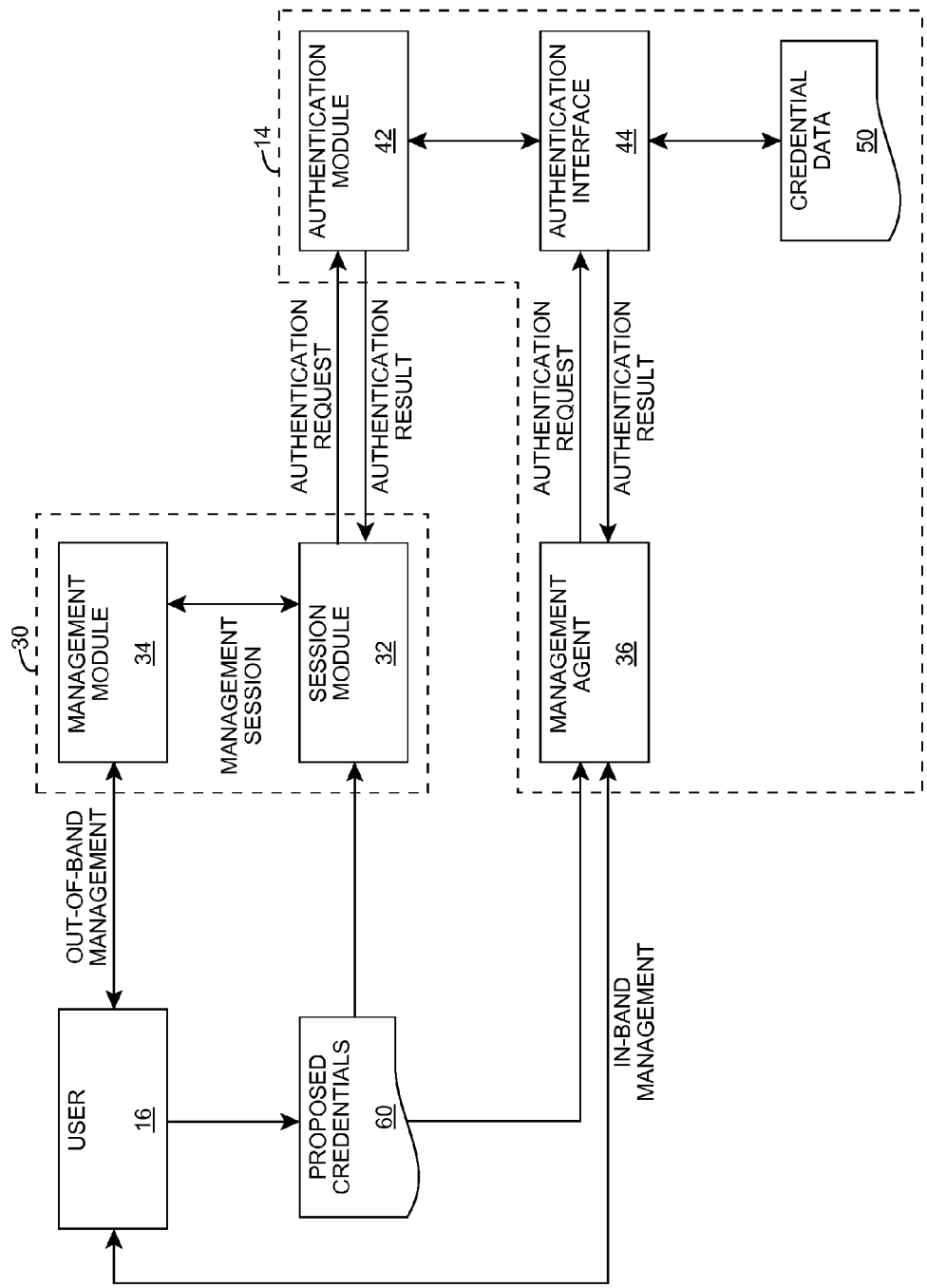

AUTHENTICATION FOR COMPUTER SYSTEM MANAGEMENT

FIELD OF THE INVENTION

Aspects of the invention relate generally to a managed computer system, and more particularly, to a solution for authenticating a user requesting to manage the managed computer system.

BACKGROUND OF THE INVENTION

Frequently, a user desires to perform management functions for a server using a network connection, such as an Ethernet connection. To this extent, a server may include System Management Software (SMS), which includes an agent executing on the server that enables the user to perform management functions over a network (e.g., "in-band management"). Additionally, current servers often include an auxiliary processor and supporting hardware dedicated to managing the server system, frequently referred to as a "service processor" (also "management processor"). The service processor can provide the user with a second communications path for performing management functions (e.g., "out-of-band management"). Examples of how this second communications path could be enabled include a dedicated network interface, a network interface shared with the system, a dedicated serial interface, or a shared serial interface.

The management functionality implemented by both the SMS agent and the service processor may overlap. For example, both may support power control, environmental monitoring, monitoring and reporting of a status for a field replaceable unit (FRU), alerting capabilities, resource throttling, and/or the like. However, the SMS agent may provide some functionality not provided by the service processor and/or the service processor may provide some functionality not provided by the SMS agent. Regardless, a user may desire to use both the service processor and the SMS agent to manage the server.

Since many management functions are potentially disruptive to the tasks and applications executing on the server, the user is typically authenticated before being allowed to access the management functions supported by the SMS agent or the service processor. Currently, the SMS agent utilizes an Application Program Interface (API) provided by a host operating system on the server to authenticate the user, while the service processor maintains its own authentication data (e.g., user accounts and passwords) stored in non-volatile storage for the service processor, which is used to authenticate the user. As a result, a user that desires to utilize both the service processor and the SMS agent must ensure that its authentication data is included on the server as well as on the service processor.

In general, it is desirable to limit the number of different authentication credentials (e.g., user name and password) for a user. As the number of different authentication credentials grows, it becomes more difficult for the user to manage them (e.g., keep them synchronized, if desired, remember different user names/passwords, etc.). This can result in an increase in the administrative costs for the authentication credentials, as well as a security risk that the passwords will be of a reduced complexity. One approach to this situation is to provide a centralized authentication mechanism, such as lightweight directory access protocol (LDAP). However, such a mechanism requires significant additional resources in order to be implemented on a typical service processor as well as supporting infrastructure available in the network.

BRIEF SUMMARY OF THE INVENTION

Aspects of the invention provide an improved solution for authenticating a user seeking to manage a computer system. A user seeking to perform out-of-band management of the computer system can provide a set of credentials to a service processor, which in turn provides them to the computer system for authentication. Additionally, a user seeking to perform in-band management of the computer system can provide a set of credentials to a management agent executing on the computer system for authentication. In either case, the computer system can authenticate the set of credentials, e.g., using an operating system interface.

A first aspect of the invention provides a method of managing a computer system, the method comprising: obtaining a set of credentials for a user requesting to manage the computer system on a service processor; providing the set of credentials for authentication by the computer system; and receiving an authentication result based on the set of credentials on the service processor.

A second aspect of the invention provides a system comprising: a service processor for managing a managed computer system, the service processor including: a system for obtaining a set of credentials for a user requesting to manage the managed computer system; and a system for providing the set of credentials for authentication by the managed computer system and receiving an authentication result based on the set of credentials.

A third aspect of the invention provides a computer program comprising program code stored on a computer-readable medium, which when executed, enables a computer system to implement a method of managing a computer system, the method comprising: obtaining a set of credentials for a user requesting to manage the computer system on a service processor; providing the set of credentials for authentication by the computer system; and receiving an authentication result based on the set of credentials on the service processor.

A fourth aspect of the invention provides a method of authenticating a user, the method comprising: receiving an authentication request from a service processor in a device driver for the service processor, the authentication request including a set of credentials for a user requesting to manage a computer system; and authenticating the set of credentials on the computer system.

A fifth aspect of the invention provides a system comprising: a managed computer system including: a device driver for use in conjunction with a service processor, the device driver including a set of authentication commands for authenticating a user requesting to manage the managed computer system using the service processor.

A sixth aspect of the invention provides a computer program comprising program code stored on a computer-readable medium, which when executed, enables a computer system to implement a method of authenticating a user, the method comprising: receiving an authentication request from a service processor in a device driver for the service processor, the authentication request including a set of credentials for a user requesting to manage a computer system; and authenticating the set of credentials on the computer system.

A seventh aspect of the invention provides a method of generating a system, the method comprising: obtaining a managed computer system; and installing a service processor for managing the managed computer system, the service processor including: a system for obtaining a set of credentials for a user requesting to manage the managed computer system; and a system for providing the set of credentials for authentication by the managed computer system and receiving an authentication result based on the set of credentials.

An eighth aspect of the invention provides a business method for managing a system, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

FIG. 2 shows an illustrative flow diagram implemented by the environment of FIG. 1 according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
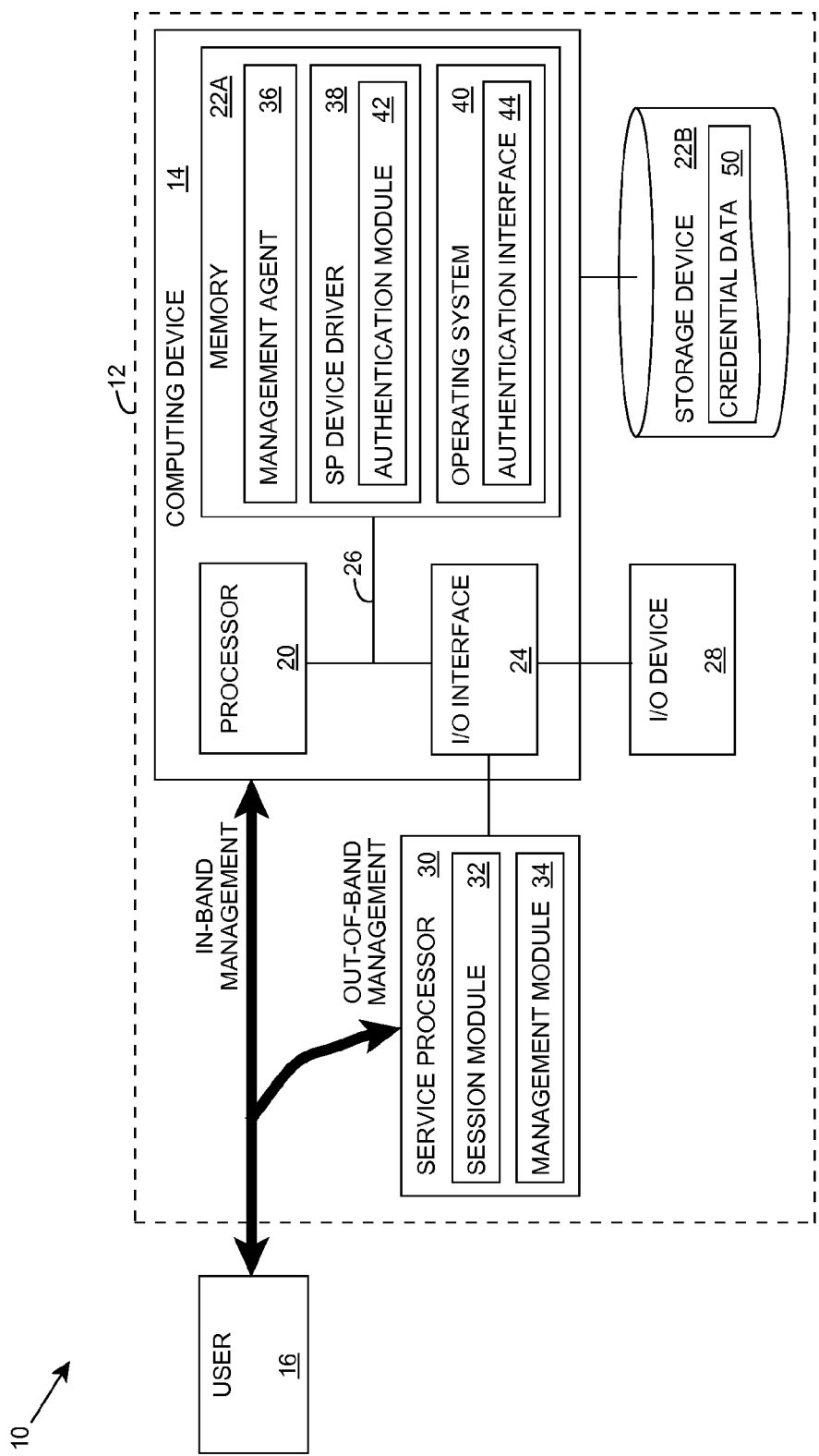
FIG. 1 shows an illustrative environment according to an embodiment of the invention.

As indicated above, aspects of the invention provide an improved solution for authenticating a user seeking to manage a computer system. A user seeking to perform out-of-band management of the computer system can provide a set of credentials to a service processor, which in turn provides them to the computer system for authentication. Additionally, a user seeking to perform in-band management of the computer system can provide a set of credentials to a management agent executing on the computer system for authentication. In either case, the computer system can authenticate the set of credentials, e.g., using an operating system interface. As used herein, unless otherwise noted, the term "set" means one or more (i.e., at least one) and the phrase "any solution" means any now known or later developed solution.

Turning to the drawings, FIG. 1 shows an illustrative environment 10 according to an embodiment of the invention. In particular, environment 10 includes a computer system 12 that includes a computing device 14 and a service processor 30. In general, service processor 30 (also commonly referred to as a management processor) enables a user 16 to manage computing device 14. To this extent, computing device 14 can comprise any type of managed computer system, such as a server. User 16 can comprise an application executing on a computer system, which requests to manage computing device 14, a computer system being used by an individual who requests to manage computing device 14, and/or the like. To this extent, user 16 can communicate with service processor 30 using any type of communications link, such as an Ethernet network connection. When user 16 manages computing device 14 using service processor 30, the management is commonly referred to as "out-of-band management", since the computing resources of computing device 14 are not utilized.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as management agent 36, which is stored in a storage system, such as memory 22A and/or storage device 22B. While executing program code, processor 20 can read and/or write data, such as credential data 50, to/from memory 22A, storage device 22B, and/or I/O interface 24. Bus 26 provides a communications link between each of the components in computing device 14 and I/O interface 24 provides a communications pathway into/out of computing device 14.

I/O device 28 can comprise any device that transfers information between a user and computing device 14. To this extent, I/O device 28 can comprise a user I/O device to enable an individual user to interact with computing device 14 and/or a communications device to enable a system user to communicate with computing device 14 using any type of communications link. For example, I/O device 28 can comprise a network adapter, which enables computing device 14 to communicate with users, such as user 16, via a network, such as an Ethernet network. In an embodiment of the invention, service processor 30 comprises an I/O device, e.g., a printed circuit board or the like, which connects to bus 26 via I/O interface 24.

In any event, computing device 14 can comprise any general purpose computing article of manufacture capable of executing program code installed thereon. For example, computing device 14 is shown including an operating system 40 that includes an authentication interface 44, a service processor (SP) device driver 38 that includes an authentication module 42, and a management agent 36, each of which is shown implemented as program code executing on computing device 14. However, it is understood that computing device 14 and its corresponding program code is only representative of various possible equivalent computing devices. To this extent, in other embodiments, the functionality provided by computing device 14 and the program code installed thereon can be implemented by a computing article of manufacture that includes any combination of general and/or specific purpose hardware and/or program code. In each embodiment, the program code and hardware can be created using standard programming and engineering techniques, respectively. Additionally, in one embodiment, computing device 14 comprises a server, which includes multiple processors 20 and multiple partitions (e.g., system images) in memory 22A, each of which includes a separately executing operating system and applications, etc.

Similarly, computer system 12 is only illustrative of various types of computer systems for implementing aspects of the invention. For example, computing device 14 can comprise two or more computing devices that communicate over any type of communications link, such as a network, a shared memory, or the like. Still further, each computing device 14 and service processor 30 in computer system 12 can communicate with one or more other computing devices external to computer system 12, such as user 16, using any type of communications link. In either case, the communications link can comprise any combination of various types of wired and/or wireless links; comprise any combination of one or more types of networks; and/or utilize any combination of various types of transmission techniques and protocols.

It is understood that service processor 30 and/or user 16 each can include similar components as shown and described with respect to computing device 14. To this extent, service processor 30 can comprise a processor, memory, non-volatile storage, and/or the like. Further, service processor 30 can include an I/O device (e.g., an Ethernet card) for communicating with user 16 over a network without the use of the resources of computing device 14. Still further, service processor 30 can comprise a general purpose computing device that includes an operating system and one or more applications executing thereon. To this extent, some or all of the functionality shown and described herein with respect to session module 32 and management module 34 can be implemented by a computer program executing on service processor 30. Similarly, user 16 can comprise a general or specific computing device that is utilized by an individual user and/or is executing an application that requests to manage and/or manages computing device 14.

As discussed herein, computer system 12 enables a user 16 to manage computing device 14. To this extent, user 16 can manage computing device 14 by communicating with service processor 30 (e.g., "out-of-band" management). Additionally, management agent 36 enables user 16 to manage computing device 14 without the use of service processor 30. In this case, the management uses the resources of computing device 14 and is commonly referred to as "in-band management". The management of computing device 14 is described further herein with respect to each of the modules shown in FIG. 1. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for authenticating user 16 to perform either in-band management or out-of-band management. To this extent, FIG. 2 shows an illustrative flow diagram implemented by environment 10 (FIG. 1) according to an embodiment of the invention. In order to perform either type of management, user 16 can be required to provide a set of proposed credentials 60. Proposed credentials 60 can comprise any type of authentication data. For example, proposed credentials 60 can comprise a user name and password, a unique identifier, such as a media access control (MAC) address, a digital signature, and/or the like. Regardless, user 16 can provide proposed credentials 60 to either session module 32 (for out-of-band management) or management agent 36 (for in-band management).

With respect to out-of-band management, session module 32 can obtain proposed credentials 60 as part of a request to establish a management session for performing out-of-band management on computing device 14 (e.g., process one or more management operations). For example, user 16 can establish a network connection (e.g., a transmission control protocol (TCP) connection) with session module 32 and send the request. After obtaining proposed credentials 60, session module 32 can provide the proposed credentials 60 for authentication by computing device 14. In an embodiment of the invention, session module 32 communicates the proposed credentials 60 using a device driver interface for service processor 30. To this extent, the device driver interface can include a set of authentication commands/functions, which can be used by session module 32 to request authentication.

Subsequently, session module 32 can receive an authentication result based on the proposed credentials 60. When the authentication result indicates a valid user 16, session module 32 can establish the management session for user 16, and management module 34 can enable user 16 to perform the out-of-band management of computing device 14. In particular, management module 34 can process one or more management operations for user 16. The management operation(s) can comprise any type of management operation(s) now known or later implemented using a service processor 30, such as, power control, environmental monitoring, monitoring and reporting of a status for a field replaceable unit (FRU), alerting capabilities, resource throttling, and/or the like. Alternatively, when the authentication result indicates an invalid user 16, session module 32 can provide a notification for presentation to user 16 that the proposed credentials 60 were invalid, and enable user 16 to provide alternative proposed credentials 60 using any solution.

As noted herein, session module 32 can request authentication by computing device 14 using a device driver for service processor 30. To this extent, an embodiment of the invention provides a device driver 38 (FIG. 1) for service processor 30 that includes an authentication module 42. Device driver 38 is installed on and executes on computing device 14 and enables communications between service processor 30 and computing device 14. Authentication module 42 includes a set of authentication commands that enable session module 32 to request authentication and receive an authentication result in response to the request. Additionally, authentication module 42 includes the necessary functionality to enable device driver 38 to process the authentication commands and authenticate proposed credentials 60 on computing device 14.

For example, in an embodiment of the invention, authentication module 42 utilizes an operating system authentication interface 44 to perform the authentication. Authentication interface 44 can include a set of application program interfaces (APIs) that enable applications executing in operating system 40 (FIG. 1) to authenticate user credentials against credential data 50. Credential data 50 can comprise any type of store of credentials (e.g., user name/password combinations) that are known by computing device 14 and are acceptable to enable a particular level of access to the functionality of computing device 14. To this extent, authentication can include both the confirmation of a valid combination of credentials (e.g., user name and password) as well as an appropriate level of access for the requested functionality (e.g., allowed to perform management functions on computing device 14). Further, authentication module 42 and/or authentication interface 44 can enable computing device 14 to authenticate proposed credentials 60 using one or more alternative authentication solution(s), e.g., a remote authentication solution, such as lightweight directory access protocol (LDAP) and/or the like.

With respect to in-band management of computing device 14, user 16 can provide proposed credentials 60 for processing by management agent 36. After obtaining proposed credentials 60, management agent 36 can authenticate proposed credentials 60 using, for example, authentication interface 44 for operating system 40 (FIG. 1) as discussed herein. Subsequently, when the authentication indicates a valid user 16, management agent 36 can enable user 16 to request management operation(s) and process them accordingly. The management operation(s) can comprise any type of management operation(s) now known or later implemented using a management agent 36, such as, power control, environmental monitoring, monitoring and reporting of a status for a field replaceable unit (FRU), alerting capabilities, resource throttling, and/or the like.

As a result, aspects of the invention provide a solution in which user 16 can be authenticated for out-of-band and in-band management using the same credential data 50, e.g., stored on computing device 14. For example, both authentication module 42 in device driver 38 (FIG. 1) and management agent 36 can utilize an authentication interface 44 of operating system 40 (FIG. 1) to authenticate user 16 against a set of credential data 50. In this manner, user 16 will only be required to maintain a single set of credentials that can be used to perform either type of management of computing device 14. As a result, user 16 will be required to maintain fewer sets of credentials, credentials for user 16 will be stored in fewer locations, and/or the like.

While shown and described herein as a method and system for managing a computer system 12 (FIG. 1), it is understood that the invention further provides various alternative embodiments. For example, in one embodiment, the invention provides a computer program stored on a computer-readable medium, which when executed, enables a service processor 30 to authenticate a user on the managed computing device 14. To this extent, the computer-readable medium includes program code, such as session module 32, management module 34, and/or device driver 38 (FIG. 1), which implement the processes described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system. In this case, a computer system, such as computer system 12 (FIG. 1), can be obtained (e.g., created, maintained, having made available to, provided, etc.) and one or more programs/systems for performing the processes described herein can be obtained (e.g., created, purchased, used, modified, etc.) and deployed to the computer system. To this extent, the deployment can comprise one or more of: (1) installing program code (e.g., device driver 38 (FIG. 1)) on a computing device, such as computing device 14 (FIG. 1), from a computer-readable medium; (2) adding one or more computing devices (e.g., service processor 30) to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to generate and/or manage computer system 12 (FIG. 1) as described herein. In this case, the service provider can manage (e.g., create, maintain, support, etc.) a computer system, such as computer system 12 (FIG. 1), that performs the processes described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a managed computer system, the method comprising:
   authenticating a user requesting access to a service processor to direct the service processor to perform a set of management operations on the managed computer system, the authenticating including:
      obtaining, on the service processor, a set of proposed credentials for the user requesting to direct the service processor to perform the set of management operations on the managed computer system, wherein the set of proposed credentials correspond to a set of credentials that enable the user to directly access the managed computer system, wherein the service processor comprises at least one computing device, distinct from the managed computer system, configured to enable the user to manage the managed computer system over a network without use of a communications path of the managed computer system;
      providing the set of proposed credentials from the service processor for authentication by the managed computer system in response to obtaining the set of proposed credentials for the user; and
      receiving an authentication result on the service processor based on the set of proposed credentials in response to providing the set of proposed credentials.

2. The method of claim 1, the authentication result indicating a valid user, the method further comprising processing the set of management operations for the user using the service processor.

3. The method of claim 1, the authenticating further comprising authenticating the set of proposed credentials on the managed computer system using credential data stored on the managed computer system.

4. The method of claim 3, wherein the authenticating the set of proposed credentials utilizes an operating system authentication interface.

5. The method of claim 1, the providing utilizing a device driver interface for the service processor.

6. A system comprising:
   a service processor for managing a managed computer system, the service processor including:
      at least one computing device, distinct from the managed computer system, configured to enable a user to access the service provider to direct the service processor to perform a set of management operations on the managed computer system over a network without use of a communications path of the managed computer system by performing a method comprising authenticating the user requesting access to the service processor to direct the service processor to perform the set of management operations on the managed computer system, the authenticating including:

obtaining, on the service processor, a set of proposed credentials for the user requesting to direct the service processor to perform the set of management operations on the managed computer system, wherein the set of proposed credentials correspond to a set of credentials that enable the user to directly access the managed computer system;

providing the set of proposed credentials for authentication by the managed computer system in response to obtaining the set of proposed credentials for the user; and receiving an authentication result based on the set of proposed credentials in response to providing the set of proposed credentials.

7. The system of claim 6, the method further including processing the set of management operations for a valid user.

8. The system of claim 6, the obtaining including establishing a network connection with the user.

9. The system of claim 6, the providing including communicating with a device driver executing on the managed computer system.

10. The system of claim 9, further comprising:
the managed computer system; and
a device driver executing on the managed computer system, the device driver including a set of authentication commands for use in conjunction with the service processor.

11. The system of claim 10, further comprising an operating system for the managed computer system, the operating system including an authentication interface for authenticating the set of proposed credentials using credential data stored on the managed computer system.

12. A system comprising:
a managed computer system including:
at least one computing device; and
a device driver installed on the at least one computing device for use in conjunction with a service processor, the device driver including a set of authentication commands for authenticating a user requesting to access the service processor, wherein the service processor is distinct from the managed computer system and is configured to enable the user to direct the service processor to perform the set of management operations on the managed computer system over a network without use of a communications path of the managed computer system, and wherein the set of authentication commands enable the service processor to authenticate the user requesting access to the service processor by performing a method including:
providing a set of proposed credentials for authentication by the managed computer system, wherein the set of proposed credentials correspond to a set of credentials that enable the user to directly access the managed computer system; and
receiving an authentication result based on the set of proposed credentials in response to providing the set of proposed credentials.

13. The system of claim 12, the managed computer system further including a management agent for enabling a user to manage the managed computer system via a network connection.

14. The system of claim 13, the managed computer system further including an operating system including an authentication interface for authenticating user credentials using credential data stored on the managed computer system, the device driver and the management agent using the authentication interface to authenticate a user.

15. The system of claim 12, further comprising the service processor, the service processor including a system for authenticating the user by providing the set of proposed credentials for authentication by the managed computer system and receiving the authentication result.

16. The system of claim 15, the service processor further including a system for processing the set of management operations for a valid user.

17. A method of generating a system, the method comprising:
obtaining a managed computer system; and
installing a service processor for managing the managed computer system, the service processor including:
at least one computing device, distinct from the managed computer system, configured to enable a user to access the service provider to direct the service processor to perform a set of management operations on the managed computer system over a network without use of a communications path of the managed computer system by performing a method comprising authenticating the user requesting access to the service processor to direct the service processor to perform the set of management operations on the managed computer system, the authenticating including:
obtaining, on the service processor, a set of proposed credentials for the user requesting to direct the service processor to perform the set of management operations on the managed computer system, wherein the set of proposed credentials correspond to a set of credentials that enable the user to directly access the managed computer system;
providing the set of proposed credentials for authentication by the managed computer system in response to obtaining the set of proposed credentials for the user; and
receiving an authentication result based on the set of proposed credentials in response to providing the set of proposed credentials.

18. The method of claim 17, the obtaining the managed computer system including installing a device driver for use in conjunction with the service processor on the managed computer system, the device driver including a set of authentication commands for authenticating the user requesting to manage the managed computer system using the service processor.

19. The method of claim 17, the obtaining the managed computer system including installing an operating system on the managed computer system, the operating system including an authentication interface for authenticating user credentials.

20. The method of claim 1, further comprising:
receiving a user request requesting direct access to the managed computer system to direct the managed computer system to perform the set of management operations, the user request including the set of proposed credentials that enable the user to directly access the managed computer system; and
authenticating the user request using the set of proposed credentials that enable the user to directly access the managed computer system in response to the receiving of the user request.

* * * * *